(12) United States Patent
Hajji et al.

(10) Patent No.: US 10,851,231 B2
(45) Date of Patent: *Dec. 1, 2020

(54) POLYMER COMPOSITION WITH FILLER, ITS METHOD OF PREPARATION AND USE

(71) Applicant: Arkema France, Colombes (FR)

(72) Inventors: Philippe Hajji, Chatillon d'Azergues (FR); Rosangela Pirri, Montardon (FR); Alexandre Vermogen, Soucieu en Jarrest (FR); Alain Wilhelm, Orlienas (FR)

(73) Assignee: Arkema France, Colombes (FR)

( * ) Notice: Subject to any disclaimer, the term of this patent is extended or adjusted under 35 U.S.C. 154(b) by 30 days.

This patent is subject to a terminal disclaimer.

(21) Appl. No.: 15/740,854

(22) PCT Filed: Jul. 8, 2016

(86) PCT No.: PCT/EP2016/066342
§ 371 (c)(1),
(2) Date: Dec. 29, 2017

(87) PCT Pub. No.: WO2017/005920
PCT Pub. Date: Jan. 12, 2017

(65) Prior Publication Data
US 2018/0186992 A1    Jul. 5, 2018

(30) Foreign Application Priority Data
Jul. 9, 2015   (FR) ...................... 15 56527

(51) Int. Cl.
C08L 27/06 (2006.01)
C08J 3/21 (2006.01)
C08K 3/00 (2018.01)
C08L 27/08 (2006.01)
C08L 33/10 (2006.01)
C08L 33/12 (2006.01)

(52) U.S. Cl.
CPC .............. *C08L 27/06* (2013.01); *C08J 3/212* (2013.01); *C08K 3/00* (2013.01); *C08L 27/08* (2013.01); *C08L 33/10* (2013.01); *C08L 33/12* (2013.01); *C08J 2327/06* (2013.01); *C08J 2433/12* (2013.01); *C08L 2203/16* (2013.01); *C08L 2203/18* (2013.01); *C08L 2205/025* (2013.01); *C08L 2205/03* (2013.01); *C08L 2205/06* (2013.01)

(58) Field of Classification Search
CPC .......... C08L 27/06; C08L 33/12; C08L 33/10; C08L 27/08; C08L 2203/18; C08L 2203/16; C08L 2205/025; C08L 2203/03; C08L 2205/06; C08J 2327/06; C08J 2433/12; C08J 3/212; C08J 2203/18; C08K 3/00
USPC .......................................... 534/425; 524/425
See application file for complete search history.

(56) References Cited

U.S. PATENT DOCUMENTS

| | | |
|---|---|---|
| 3,373,229 A | 3/1968 | Philpot et al. |
| 4,329,276 A | 5/1982 | Reardon |
| 4,564,653 A | 1/1986 | Kamata et al. |
| 4,584,349 A | 4/1986 | Lehr |
| 4,801,648 A | 1/1989 | Fink et al. |
| 2009/0111915 A1 | 4/2009 | Lavallee et al. |
| 2011/0305862 A1 | 12/2011 | Rachwal |
| 2012/0189837 A1* | 7/2012 | Lavallee .................. C08L 27/24 428/304.4 |
| 2014/0066566 A1 | 3/2014 | Kautz et al. |
| 2014/0343179 A1* | 11/2014 | Raymond .............. C08J 9/0066 521/92 |
| 2015/0284553 A1 | 10/2015 | Rachwal |

FOREIGN PATENT DOCUMENTS

EP    0 143 321 A1    10/1984

* cited by examiner

*Primary Examiner* — Ronald Grinsted
(74) *Attorney, Agent, or Firm* — Lynn B. Morreale

(57) ABSTRACT

The present invention relates to a polymeric processing aid its composition and its process of preparation and its use. In particular, the present invention relates to a polymeric processing aid and its use for filled halogen containing thermoplastic polymers. More particularly, the present invention relates to a filled halogenated containing polymer composition with a polymeric processing aid, its composition and its process of preparation.

19 Claims, No Drawings

POLYMER COMPOSITION WITH FILLER, ITS METHOD OF PREPARATION AND USE

CROSS-REFERENCE TO RELATED APPLICATIONS

This application is a national stage application under 35 U.S.C. § 371 of PCT/EP2016/066342, filed Jul. 8, 2016 which claims benefit to application FR15.56527, filed Jul. 9, 2015.

FIELD OF THE INVENTION

The present invention relates to a polymeric processing aid its composition and its process of preparation and its use.

In particular the present invention it relates to a polymeric processing aid and its use for filled halogen containing thermoplastic polymers.

More particularly the present invention relates to a filled halogenated containing polymer composition with a polymeric processing aid, its composition and its process of preparation.

Technical Problem

Fillers are used in thermoplastic polymer compositions in general and in halogenated polymer compositions in particularly for a variety of reasons. They can extend the composition, increase stiffness and strength, and shorten cycle times. They prevent hang-up in dies and neutralize the products of degradation. Fillers cans also be used to add color, opacity and conductivity or they can be used as a low cost material that lowers the cost of the composition as the filler is less expensive the other ingredients of the formulation.

However the addition of filler can change the fusion characteristics of the polymer composition. Proper fusion is necessary to obtain good physical properties.

Polymer compositions comprising polymers with specific characteristic (such as polymer composition, glass transition temperature or specific molecular weight range for naming some characteristics) are used as additives for thermoplastic polymer compositions in general and in halogenated polymer compositions in particularly in order to enhance the processing behavior of these various polymers or plastic resin or to improve their performance. Therefor these additives are also called processing aids.

The additive polymer composition is compatible with thermoplastic polymer compositions in general and in halogenated polymer compositions in particularly.

Processing aids in small quantities in thermoplastic polymer compositions in general and in halogenated polymer compositions in particularly can improve the processing characteristics through an acceleration of the fusion process of said thermoplastic polymer compositions in general and of halogenated polymer compositions in particularly.

With a filler added to the composition, the processing aid used for the non-filled composition does not possess the same performance as in a filled composition, especially in view of fusion efficiency of the composition, but also in view of impact strength.

The objective of the present invention is to propose a polymer composition which acts as processing aid for filled halogenated polymer compositions.

The objective of the present invention is as well to propose a polymer composition which acts as processing aid for filled halogenated polymer compositions independently of the ratio of the filler in the final composition.

An objective of the present invention is also to have a polymer composition that can be used to optimize the melt behaviour especially the speed of fusion of filled halogenated polymer compositions.

Another objective of the present invention is to avoid the change of the polymer composition acting as processing aid depending on the ratio of the filler in the filled halogenated polymer compositions.

An additional objective of the present invention is the reduction of the price of a polymer composition which acts as processing aid for filled halogenated polymer compositions by addition of low cost components without influencing the fusion efficiency.

Still another objective of the present invention is a method for manufacturing a polymer composition which act as processing aid for filled halogenated polymer compositions.

Still an additional objective is having a process for preparing a polymer composition that can be used to increase the melt behaviour of filled halogenated polymer compositions.

Still a further objective is to obtain a filled halogenated polymer composition that is easily processable independently of the ratio of the filler and has the same (meth) acrylic processing aid.

A still further objective of the present invention is also to have a polymer composition that can be used to optimize the melt behaviour especially the speed of fusion of filled halogenated polymer compositions and does not influence in a important way the impact performance, latter meaning keeping the level or a decrease of less than 50%.

[BACKGROUND OF THE INVENTION] PRIOR ART

The document US 2009/0111915 discloses acrylic copolymers for use in highly filled compositions. In particular the document disclosed filled polyvinylchloride (PVC) materials as a composition for flooring comprising 70 wt % to 95 wt % filler, 1 wt % to 15 wt % PVC and 0.5 wt % to 4 wt % of acrylic copolymer or a composition for siding or pipe comprising 15 wt % to 35 wt % filler, 50 wt % to 95 wt % PVC and 0.25 to 6 wt % of acrylic copolymer.

The document WO 2010/099160 discloses composite polymer modifiers. The document discloses a composite polymer modifier consisting of 99 wt % to 1 wt % of inorganic filler and from 1 wt % to 99 wt % of a polymeric processing aid and 0 wt % to 80% of an impact modifier.

The document U.S. Pat. No. 3,373,229 discloses vinyl polymer compositions. The compositions comprises polyvinyl chloride and high molecular weight polymers of methyl methacrylate or copolymers of methyl meth acrylate with a small amount of an alkyl acrylate as processing aid. The composition might comprise a filler.

The document U.S. Pat. No. 4,329,276 discloses molding components. The molding component is based on polyvinyl chloride comprising a component composition. The component composition and comprises between 40-85 wt % of an acrylic polymer preferably having a Tg between 70° C. and 90° C., and comprising preferably methyl methacrylate and butyl methacrylate in a proportion 50/50 to 85/15.

The document US2012/189837 discloses an acrylic process aid for vinyl foam extrusion. The acrylic process aid is an acrylic copolymer preferably having a Tg less than 60° C.

In the examples a copolymer of methy methacrylate (70%) with butyl acrylate (30%) is disclosed. The acrylic copolymer used does not comprise a filler.

None of the prior art documents discloses a filled polymer composition comprising a halogen containing thermoplastic polymer and a (meth)acrylic copolymer with a filler where a part of the filler is added to the composition with the (meth)acrylic copolymer and a part of the filler is added to the composition with the halogen containing thermoplastic polymer.

BRIEF DESCRIPTION OF THE INVENTION

Surprisingly it has been found that a composition comprising
- a) a (meth)acrylic copolymer (A1) or a mixture of two (meth)acrylic copolymers (A1a) and (A1b)
- b) a filler (F) or a mixture of two fillers (F1) and (F2)
- c) a halogen containing thermoplastic polymer characterized that the glass transition temperature Tg of the (meth)acrylic copolymer (A1) is less than 105° C. and that the quantity of the filler (F) or the mixture of two fillers (F1) and (F2) is between 1 phr and 250 phr relative to the halogen containing thermoplastic polymer, gives a composition with a short fusion time.

Surprisingly it has also been found that a process for preparing a composition comprising
- a) a (meth)acrylic copolymer (A1) or a mixture of two (meth)acrylic copolymers (A1a) and (A1b)
- b) a filler (F) or a mixture of two fillers (F1) and (F2)
- c) a halogen containing thermoplastic polymer said process comprises the step of
blending a compositions P1 with a halogen containing polymer and a filler (F) or (F2) characterized that
the composition P1 comprises an (meth)acrylic copolymer (A1) or a mixture of two (meth)acrylic copolymers (A1a) and (A1b) and a filler (F) or (F1) and
wherein the glass transition temperature Tg of the (meth)acrylic copolymer (A1) or the mixture of two (meth)acrylic copolymers (A1a) and (A1b) is less than 105° C. and that the quantity of the filler (F1) and (F2) together is between 1 phr and 250 phr in view of the halogen containing thermoplastic polymer, gives a composition with a short fusion time.

Surprisingly it has also been found that a process for preparing a composition comprising
- a) a (meth)acrylic copolymer (A1) or a mixture of two (meth)acrylic copolymers (A1a) and (A1b)
- b) a filler (F) or a mixture of two fillers (F1) and (F2)
- c) a halogen containing thermoplastic polymer said process comprises the step of
blending two compositions P1 and P2 characterized that
the composition P1 comprises an (meth)acrylic copolymer (A1) or a mixture of two (meth)acrylic copolymers (A1a) and (A1b) and a filler F1 and
the composition P2 a halogen containing polymer and a filler F2
wherein the glass transition temperature Tg of the (meth)acrylic copolymer (A1) or the mixture of two (meth)acrylic copolymers (A1a) and (A1b) is less than 105° C. and that the quantity of the filler (F1) and (F2) together is between 1 phr and 250 phr in view of the halogen containing thermoplastic polymer, gives a composition with a short fusion time.

Surprisingly it has been found that a composition P1 comprising an (meth)acrylic copolymer (A1) or a mixture of two (meth)acrylic copolymers (A1a) and (A1b) and a filler (F) or (F1) can be used to decrease the fusion time of composition comprising a halogen containing polymer and a filler (F) or (F2) wherein the glass transition temperature Tg of the (meth)acrylic copolymer is less than 105° C. and that the quantity of the filler (F) or (F1) and (F2) together is between 1 phr and 250 phr in view of the halogen containing thermoplastic polymer.

Surprisingly it has also been found that a composition P1 comprising an (meth)acrylic copolymer (A1) or a mixture of two (meth)acrylic copolymers (A1a) and (A1b) and a filler (F) or (F1) can be used to decrease the fusion time of composition P2 comprising halogen containing polymer and a filler (F) or (F2) wherein the glass transition temperature Tg of the (meth)acrylic copolymer is less than 105° C. and that the quantity of the filler (F) or (F1) and (F2) together is between 1 phr and 250 phr in view of the halogen containing thermoplastic polymer.

DETAILED DESCRIPTION OF THE INVENTION

According to a first aspect, the present invention relates to a composition comprising
- a) a (meth)acrylic copolymer (A1) or a mixture of two (meth)acrylic copolymers (A1a) and (A1b)
- b) a filler (F) or a mixture of two fillers (F1) and (F2)
- c) a halogen containing thermoplastic polymer characterized that the glass transition temperature Tg of the (meth)acrylic copolymer (A1) or the mixture of two (meth)acrylic copolymers (A1a) and (A1b) is less than 105° C. and that the quantity of the filler (F) or the mixture of two fillers (F1) and (F2) is between 1 phr and 250 phr relative to the halogen containing thermoplastic polymer.

In a second aspect the present invention relates to a preparing a composition comprising
- a) a (meth)acrylic copolymer (A1) or a mixture of two (meth)acrylic copolymers (A1a) and (A1b)
- b) a filler (F) or a mixture of two fillers (F1) and (F2)
- c) a halogen containing thermoplastic polymer said process comprises the step of blending a compositions P1 with a halogen containing polymer and a filler (F) or (F2) characterized that
the composition P1 comprises an (meth)acrylic copolymer (A1) or a mixture of two (meth)acrylic copolymers (A1a) and (A1b) and a filler (F) or (F1) and
wherein the glass transition temperature Tg of the (meth)acrylic copolymer or the mixture of two (meth)acrylic copolymers (A1a) and (A1b) is less than 105° C. and that the quantity of the filler (F) or (F1) and (F2) together is between 1 phr and 250 phr in view of the halogen containing thermoplastic polymer.

In a third aspect the present invention relates to a process for preparing a composition comprising
- a) a (meth)acrylic copolymer (A1) or a mixture of two (meth)acrylic copolymers (A1a) and (A1b)
- b) a filler (F) or a mixture of two fillers (F1) and (F2)
- c) a halogen containing thermoplastic polymer said process comprises the step of blending two compositions P1 and P2 characterized that
the composition P1 comprises an (meth)acrylic copolymer (A1) or a mixture of two (meth)acrylic copolymers (A1a) and (A1b) and a filler (F) or (F1) and
the composition P2 a halogen containing polymer and a filler (F) or (F2)
wherein the glass transition temperature Tg of the (meth)acrylic copolymer (A1) or the mixture of two (meth)acrylic copolymers (A1a) and (A1b) is less than 105° C. and that the quantity of the filler (F) or (F1) and (F2) together is between 1 phr and 250 phr in view of the halogen containing thermoplastic polymer.

In a fourth aspect the present invention relates to the use of a composition P1 comprising an (meth)acrylic copolymer (A1) or a mixture of two (meth)acrylic copolymers (A1a) and (A1b) and a filler (F) or (F1) can be used to decrease the fusion time of composition comprising a halogen containing polymer and a filler (F) or (F2) wherein the glass transition temperature Tg of the (meth)acrylic copolymer or the mixture of two (meth)acrylic copolymers (A1a) and (A1b) is less than 105° C. and that the quantity of the filler (F) or (F1) and F2 together is between 1 phr and 250 phr in view of the halogen containing thermoplastic polymer.

In a fifth aspect the present invention relates to the use of a composition P1 comprising an (meth)acrylic copolymer (A1) or a mixture of two (meth)acrylic copolymers (A1a) and (A1b) and a filler F1 to decrease the fusion time of composition P2 comprising halogen containing polymer and a filler F2 wherein the glass transition temperature Tg of the (meth)acrylic copolymer (A1) or the mixture of two (meth) acrylic copolymers (A1a) and (A1b) is less than 105° C. and that the quantity of the filler F1 and F2 together is between 1 phr and 250 phr in view of the halogen containing thermoplastic polymer.

By the term "copolymer" as used is denoted that the polymer consists of at least two different monomers.

By the term "(meth)acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer.

By the term "dispersion" as used is denoted a colloidal system with a continuous liquid phase and a discontinuous solid phase that is distributed throughout the continuous phase.

By the term "emulsion" as used is denoted a liquid/liquid mixture of a liquid discontinuous phase in a liquid continuous phase.

By the term "PVC" as used is understood polyvinyl chloride in form of homopolymer or copolymer comprising at least 50 wt % of vinyl chloride.

By the term "filler" as used is understood a solid extender added to a polymer in order to enhance properties and/or reduce costs.

By the abbreviation "phr" is meant parts per hundred parts of resin. For example 15 phr of filler in a PVC formulation means that 15 kg of filler are added to 100 kg of PVC.

With regard to the composition of the present invention, it comprises between 1 phr and 250 phr of filler (F) or a mixture of two fillers (F1) and (F2) relative to the halogen containing thermoplastic polymer.

Preferably the composition, of the present invention comprises more than 2 phr of filler (F) or a mixture of two fillers (F1) and (F2) relative to the halogen containing thermoplastic polymer.

More preferably the composition, of the present invention comprises between 2 phr and 200 phr, still more preferably between 3 phr and 180 phr, advantageously between 4 phr and 150 phr and more advantageously between 5 phr and 120 phr and most advantageously between 5 phr and 100 phr of filler (F) or a mixture of two fillers (F1) and (F2) relative to the halogen containing thermoplastic polymer.

The polymer composition or composition according to the invention, it comprises between 0.01 phr and 20 phr, preferably between 0.05 and 17 phr, more preferably between 0.1 phr and 15 phr, advantageously between 0.15 phr and 12 phr and more advantageously between 0.15 phr and 10 phr of the (meth)acrylic copolymer (A1) or the mixture of two (meth)acrylic copolymers (A1a) and (A1b).

In a first most advantageously embodiment the composition according to the invention it comprises between 0.15 phr and 9 phr of the (meth)acrylic copolymer (A1) or the mixture of two (meth)acrylic copolymers (A1a) and (A1b).

In a second most advantageously embodiment the composition according to the invention it comprises between 0.15 phr and 4 phr of the (meth)acrylic copolymer (A1) or the mixture of two (meth)acrylic copolymers (A1a) and (A1b).

According to the invention a part of the filler (F) or a part of the mixture of two fillers (F1) and (F2) is added to the composition with the meth)acrylic copolymer (A1) or the mixture of two (meth)acrylic copolymers (A1a) and (A1b). The other part of the filler (F) or the other part of the mixture of two fillers (F1) and (F2) is added to the composition either apart or already with halogen containing thermoplastic polymer. By "already with halogen containing thermoplastic polymer" is meant that the said other part of the filler (F) or a part of the mixture of two fillers (F1) and (F2) is added the halogen containing thermoplastic polymer before the meth)acrylic copolymer (A1) or the mixture of two (meth)acrylic copolymers (A1a) and (A1b) comprising a part of the filler (F) or a part of the mixture of two fillers (F1) and (F2) is added.

According to a variation of the invention a part of the filler (F) or a mixture of two fillers (F1) and (F2) is added to the composition with the (meth)acrylic copolymer (A1) or the mixture of two (meth)acrylic copolymers (A1a) and (A1b) and another part of the filler (F) or a mixture of two fillers (F1) and (F2) is added to the composition with halogen containing thermoplastic polymer.

Preferably the part of the filler (F) or a mixture of two fillers (F1) and (F2) which is added to the composition apart or which is already with the halogen containing thermoplastic polymer, exceeds in quantity the part of the filler (F) or a mixture of two fillers (F1) and (F2) that is added to the composition with the (meth)acrylic copolymer (A1) or the mixture of two (meth)acrylic copolymers (A1a) and (A1b).

With regard to the (meth)acrylic copolymer (A1) or the two (meth)acrylic copolymers (A1a) and (A1b), it is a (meth) acrylic copolymer comprising at least 50 wt % of polymeric units coming from methyl methacrylate.

More preferably the polymer (A1) comprises a comonomer or comonomers which are copolymerizable with methyl methacrylate, as long as polymer (A1) is having a glass transition temperature of less than 105° C.

More preferably the two (meth)acrylic copolymers (A1a) and (A1b) comprises a comonomer or comonomers which are copolymerizable with methyl methacrylate, as long as the mixture of two (meth)acrylic copolymers (A1a) and (A1b) is having a average glass transition temperature of less than 105° C.

The comonomer or comonomers in copolymers (A1), (A1a) and (A1b) are preferably chosen from (meth)acrylic and/or vinyl monomers.

The (meth)acrylic comonomer in (meth)acrylic copolymer (A1), (A1a) and (A1b) comprises monomers chosen from C1 to C12 alkyl (meth)acrylates. The vinyl comonomer comprises monomers chosen from styrene and substituted styrene. Still more preferably (meth)acrylic comonomer in polymer (A1) comprises monomers of C1 to C4 alkyl methacrylate and/or C1 to C8 alkyl acrylate monomers.

Most preferably the acrylic or methacrylic comonomers of the (meth)acrylic copolymer (A1) or the two (meth)acrylic copolymers (A1a) and (A1b) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as meth)acrylic copolymer (A1) or the mixture of two (meth)acrylic copolymers (A1a) and (A1b) is having a glass transition temperature of less than 105° C.

Preferably the (meth)acrylic copolymer (A1) comprises at most 90 wt %, more preferably at most 85 wt % and advantageously at most 81 wt % of polymeric units coming from methyl methacrylate.

In a specific embodiment the (meth)acrylic copolymer (A1) is a copolymer of methyl methacrylate with ethyl acrylate and/or butyl acrylate.

More preferably the glass transition temperature Tg of the (meth)acrylic polymer (A1) or the average glass transition temperature Tg of the mixture of two (meth)acrylic copolymers (A1a) and (A1b) comprising at least 50 wt % of polymeric units coming from methyl methacrylate is between 60° C. and 105° C., even more preferably between 65° C. and 100° C. and advantageously between 70° C. and 100° C.

The glass transition temperature Tg can be estimated for example by dynamic methods as thermo mechanical analysis (DMA).

Preferably the mass average molecular weight Mw of the (meth)acrylic copolymer (A1) or the two (meth)acrylic copolymers (A1a) and (A1b) comprising at least 50 wt % of polymeric units coming from methyl methacrylate is at least 300 000 g/mol, preferably at least 500 000 g/mol, more preferably at least 750 000 g/mol, advantageously at least 1 000 000 g/mol and most advantageously at least 1 500 000 g/mol.

Preferably the mass average molecular weight Mw of the (meth)acrylic copolymer (A1) or the two (meth)acrylic copolymers (A1a) and (A1b) comprising at least 50 wt % of polymeric units coming from methyl methacrylate is less than 20 000 000 g/mol, preferably less than 15 000 000 g/mol, more preferably less than 12 000 000 g/mol, advantageously less than 10 000 000 g/mol and most advantageously at 9 000 000 g/mol.

More preferably the mass average molecular weight Mw of the (meth)acrylic copolymer (A1) or the two (meth)acrylic copolymers (A1a) and (A1b) comprising at least 50 wt % of polymeric units coming from methyl methacrylate is between 300 000 g/mol and 20 000 000 g/mol, still more preferably between 500 000 g/mol and 15 000 000 g/mol, even more preferably between 1 000 000 g/mol and 12 000 000 g/mol and advantageously between 1 500 000 g/mol and 10 000 000 g/mol.

The (meth)acrylic copolymer (A1) or the two (meth)acrylic copolymers (A1a) and (A1b) comprising at least 50 wt % of polymeric units coming from methyl methacrylate is preferably prepared by an emulsion polymerisation, yielding to an aqueous dispersion of spherical polymer particles of the (meth)acrylic copolymer (A1) or the two (meth)acrylic copolymers (A1a) and (A1b).

A possible variation of the method for preparing an aqueous dispersion of spherical polymer particles comprising the (meth)acrylic copolymer (A1) or the mixture of two (meth)acrylic copolymers (A1a) and (A1b) is by using a multistage process.

During one stage of the multistage process the (meth)acrylic copolymer (A1) is prepared.

The mixture of two (meth)acrylic copolymers (A1a) and (A1b) can also be prepared by a multistage process. During one stage of the multistage process the (meth)acrylic copolymer (A1a) is prepared and during another stage the (meth)acrylic copolymer (A1b).

With regard to the spherical polymer particle, it has a weight average particle size between 20 nm and 500 nm. Preferably the weight average particle size of the polymer is between 50 nm and 400 nm, more preferably between 75 nm and 350 nm and advantageously between 80 nm and 300 nm.

With regard to the filler (F), (F1) and/or (F2), it is an inorganic filler or mineral filler.

With regard to the mineral filler, mention may be made of glass fibers, hollow glass microspheres, inorganic compounds, such as minerals and salts including calcium carbonate ($CaCO_3$), silica, silicates such as calcium silicate or metasilicate, clay such as bentonite, mica, talc, alumina trihydrate, magnesium hydroxide, metal oxides, or combinations of two or more thereof.

Preferably the mineral filler is chosen from calcium carbonate, titanium dioxide or calcinated clay, silica (fumed or precipitated), clay, Montmorillonite (nano-clay), zeolite, perlite or any other type of inorganic material that can be obtained as a slurry.

More preferably a part of the filler (F) or the mixture of two fillers (F1) and (F2) is a mineral filler chosen from calcium carbonate, calcinated clay, silica (fumed or precipitated), clay, Montmorillonite (nano-clay), zeolite or perlite.

Still more preferably the mineral filler is chosen from calcium carbonate, calcinated clay, silica (fumed or precipitated), clay, Montmorillonite (nano-clay), zeolite or perlite.

In a still even more preferred embodiment the mineral filler is calcium carbonate (CaCO3).

Advantageously the calcium carbonate is chosen from precipitated calcium carbonate (PCC), grinded natural calcium carbonate (GCC) or nanosized particles of precipitated calcium carbonate (NPCC).

The mineral filler could also be in form of a slurry.

Preferably the filler (F) or (F2) that is mixed with at least one (meth)acrylic copolymer (A1) or a mixture of two (meth)acrylic copolymers (A1a) and (A1b) is in form of a slurry.

As regards the slurry of the mineral filler, it is a water dispersion of a mineral filler with solid content preferably between 5 wt % and 90 wt % and advantageously between 50 wt % and 80 wt %. This water dispersion can contain any specific surfactant, dispersing agent, additive or filler surface treatment that can advantageously improve the quality of the slurry (stability, viscosity or compatibility with the host polymer matrix).

With regard to the halogen containing polymer, mention may be made of:

homopolymers and copolymers of vinyl chloride (PVC) and of vinylidene chloride (PVDC), vinyl resins comprising vinyl chloride units in their structure, such as copolymers of vinyl chloride, and vinyl esters of aliphatic acids, especially vinyl acetate, copolymers of vinyl chloride with esters of acrylic and methacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and its copolymers with vinyl chloride and other polymerizable compounds;

polymers of vinyl chloroacetate and dichlorodivinyl ether; chlorinated polymers of vinyl carboxylate, such as vinyl acetate, vinyl propionate, vinyl butyrate, chlorinated polymeric esters of acrylic acid and of α-substituted acrylic acid, such as methacrylic acid, of nitriles, amides, alkyl esters such as acrylonitrile, (meth)acrylamide, methyl (meth)acrylate, butyl acrylate, ethyl acrylate, 2-ethylhexyl acrylate;

polymers of vinyl aromatic derivatives, such as styrene, dichlorostyrene; chlorinated rubbers;

chlorinated polymers of olefins, such as ethylene, propene, 1-butene, (2.2.1)bicyclo heptene-2, (2.2.1)bicyclo hepta-diene-2,5;

polymers and post-chlorinated polymers of chlorobutadiene and copolymers thereof with vinyl chloride, chlorinated natural and synthetic rubbers, and also mixtures of these polymers with one another or with other polymerizable compounds.

grafted halogen containing copolymers, where the halogen containing polymer part is grafted on an (meth) acrylic homo Or copolymer, in form of a particles, which could be crosslinked or not.

Preferably the halogen containing polymer is a thermoplastic polymer and not an elastomeric polymer. The glass transition temperature (measured by differential scanning calorimetry) of the thermoplastic polymer is at least 40° C., preferably 50° C.

Preferably the halogen in the halogen containing polymer is chosen from fluorine or chlorine and advantageously the halogen is chlorine.

The chlorine containing polymer is chosen from among polymers or mixtures of polymers chosen from among homopolymer vinyl chlorides such as polyvinyl chloride, polyvinylidene chloride, chlorinated polyvinyl chloride, post-chlorinated polyvinyl chloride and copolymers formed by the polymerisation of a vinyl chloride monomer with up to 40% of a comonomer such as vinyl acetate, vinyl butyrate, vinylidene chloride, propylene, methyl methacrylate and the like, as well as chlorine-containing polymers containing other polymers such as chlorinated polyethylene, terpolymers of acrylonitrile, butadiene, styrene, terpolymers of methyl methacrylate, butadiene, styrene; polyacrylate resins, poly methyl methacrylate resins and terpolymer of alkyl acrylate, methyl methacrylate, butadiene, preferably the chlorine-containing polymer is polyvinyl chloride or post-chlorinated polyvinyl chloride.

Preferably the chlorine containing polymer is chosen from homo- and copolymers of vinyl chloride (VC); comprising at least 50 wt % of VC units, preferably at least 70 wt % of VC units, more preferably at least 80 wt % of VC units, advantageously at least 85 wt % of VC units; or mixtures thereof.

With regard to the manufacturing method for a polymer composition according to the present invention, it comprises the step of
blending a composition P1 with a halogen containing polymer and a filler (F) or (F2)
characterized that the composition P1 comprises an (meth)acrylic copolymer (A1) or a mixture of two (meth)acrylic copolymers (A1a) and (A1b) and a filler (F) or (F1) and
wherein the glass transition temperature Tg of the (meth) acrylic copolymer is less than 105° C. and that the quantity of the filler (F) or (F1) and (F2) together is between 1 phr and 250 phr in view of the halogen containing thermoplastic polymer.

The filler (F1) and (F2) can be the same or different. If the filler (F1) and (F2) are the same they can be seen together simply as filler (F) and their quantity is added. The important point is that the composition P1 to be blended contains already a filler.

Preferably the blending of the compositions P1 with halogen containing polymer and a filler is made by dry blending. Preferably the dry blend is also heated.

The (meth)acrylic copolymer (A1), the mixture of two (meth)acrylic copolymers (A1a) and (A1b), the halogen containing polymer and the mineral filler are the same as defined before.

With regard to a variation of the manufacturing method for a polymer composition according to the present invention, it comprises the step of
blending two compositions P1 and P2 characterized that
the composition P1 comprises an (meth)acrylic copolymer (A1) or a mixture of two (meth)acrylic copolymers (A1a) and (A1b) and a filler (F1) and
the composition P2 comprises a halogen containing polymer and a filler F2
wherein the glass transition temperature Tg of the (meth) acrylic copolymer (A1) or the mixture of two (meth)acrylic copolymers (A1a) and (A1b) is less than 105° C. and that the quantity of the fillers F1+F2 is between 1 phr and 250 phr in view of the halogen containing thermoplastic polymer.

The filler (F1) and (F2) can be the same or different. If the filler (F1) and (F2) are the same, they can be seen together simply as filler (F) and their quantity is added in order to obtain the entire amount in the composition according to the invention. The important point is that each of the two compositions P1 and P2 which are to be blended, contain already a filler.

Preferably the blending of the two compositions P1 and P2 is made by dry blending. Preferably the dry blend is also heated.

The (meth)acrylic copolymer (A1), the mixture of two (meth)acrylic copolymers (A1a) and (A1b), the halogen containing polymer and the mineral filler are the same as defined before.

With regard to the manufacturing method for the composition P1, it comprises the step of
a) mixing of at least one (meth)acrylic copolymer (A1) or a mixture of two (meth)acrylic copolymers (A1a) and (A1b) with at least one filler (F1)
wherein the (meth)acrylic copolymer (A1) or the mixture of two (meth)acrylic copolymers (A1a) and (A1b) and the mineral filler in step a) are in form of a dispersion in aqueous phase.

Preferably the (meth)acrylic copolymer (A1) or the mixture of two (meth)acrylic copolymers (A1a) and (A1b) in form of a dispersion in aqueous phase is obtained by emulsion polymerization.

Preferably the filler in form of a dispersion in aqueous phase is the slurry of the mineral filler as described above.

The (meth)acrylic copolymer (A1) and the mineral filler are the same as defined before.

With regard to a variation of the manufacturing method for a the composition P1, it comprises the steps of
a) mixing of at least one (meth)acrylic copolymer (A1) or a mixture of two (meth)acrylic copolymers (A1a) and (A1b) with at least one filler (F) or (F1)
b) recovering of the mixture obtained in a)
c) drying the recovered mixture of step b)
wherein the (meth)acrylic copolymer (A1) or a mixture of two (meth)acrylic copolymers (A1a) and (A1b) and the mineral filler in step a) are in form of a dispersion in aqueous phase.

By recovering is meant partial or complete separation between the aqueous and solid phase, said solid phase comprises (meth)acrylic copolymer (A1) or the mixture of two (meth)acrylic copolymers (A1a) and (A1b) and the filler. In the case that a complete separation between the aqueous and solid phase of the mixture takes already place during the recovering step, no further drying is necessary. Or in other words the recovering and the drying of the mixture take place at the same time.

Preferably the recovery of the mixture of (meth)acrylic copolymer (A1) or the mixture of two (meth)acrylic copolymers (A1a) and (A1b) and filler, is made by spray drying, freeze drying or coagulation.

The (meth)acrylic copolymer (A1), the mixture of two (meth)acrylic copolymers (A1a) and (A1b) and the filler are the same as defined before.

Advantageously the recovery of the mixture of (meth)acrylic copolymer (A1) or the mixture of two (meth)acrylic copolymers (A1a) and (A1b) with the filler, is made by spray drying.

The mixture of the (meth)acrylic copolymer (A1) or the mixture of two (meth)acrylic copolymers (A1a) and (A1b) with the filler after drying comprises less than 3 wt % humidity and preferably less than 1.5 wt % humidity and more preferably less than 1.2 wt % humidity.

In the case of spray drying it is possible to mix the dispersion of mixture of (meth)acrylic copolymer (A1) or the mixture of two (meth)acrylic copolymers (A1a) and (A1b) with the filler and the slurry or dispersion filler before adding the mixture to the spray drying apparatus. It is also possible to mix the dispersion of the mixture of (meth)acrylic copolymer (A1) or the mixture of two (meth)acrylic copolymers (A1a) and (A1b) with the filler and the slurry or dispersion mineral filler inside the spray drying apparatus during the recovering step.

Spray drying is the preferred method for the recovering and/or drying for the manufacturing method for composition P1.

The composition P1 comprises between 1 wt % and 50 wt %, preferably between 2 wt % and 50 wt % and more preferably between 5 wt % and 50 wt % of one filler (F) or (F1) relatively to the complete composition made of meth)acrylic copolymer (A1) or the mixture of two (meth)acrylic copolymers (A1a) and (A1b) and the filler.

If the composition comprises other additional (meth)acrylic copolymers, they are taken into account for the calculation of the weight ratio of the filler, if they fall under the definition of meth)acrylic copolymer (A1) or the mixture of two (meth)acrylic copolymers (A1a) and (A1b) in the composition according to the invention.

The composition P2 comprises between 1 phr and 250 phr, preferably between 2 phr and 200 phr of one filler (F) or (F2).

The present invention relates also to the use of the polymer composition P1 comprising (meth)acrylic copolymer (A1) or a mixture of two (meth)acrylic copolymers (A1a) and (A1b) and a filler (F) or (F1) to decrease the fusion time of composition comprising a halogen containing polymer and a filler (F) or (F2).

The present invention relates also to the use of the polymer composition P1 comprising (meth)acrylic copolymer (A1) or a mixture of two (meth)acrylic copolymers (A1a) and (A1b) and a filler F1 to decrease the fusion time of composition P2 comprising halogen containing polymer and a filler F2.

Preferably the polymer composition P1 comprising (meth)acrylic copolymer (A1) or the mixture of two (meth)acrylic copolymers (A1a) and (A1b) and a filler F1 is in form of the polymer powder.

The polymer powder of composition P1 comprises the agglomerated spherical particles of meth)acrylic copolymer (A1) or the mixture of two (meth)acrylic copolymers (A1a) and (A1b) and particles of the mineral filler.

The polymer powder has a volume median particle size D50 between fpm and 500 µm. Preferably the volume median particle size of the polymer powder is between 10 µm and 450 µm, more preferably between 15 µm and 400 µm and advantageously between 20 µm and 300 µm.

The D10 of the particle size distribution in volume is at least 7 µm and preferably 10 µm.

The D90 of the particle size distribution in volume is at most 800 µm and preferably at most 500 µm.

The powder according to the invention is homogenous in view of the composition concerning its components: the meth)acrylic copolymer (A1) or the mixture of two (meth)acrylic copolymers (A1a) and (A1b) and the mineral filler.

Homogeneous in the present invention signifies no important variation throughout the composition. If one or several small samples (1 g or less) comprising several powder grain particles) is/are taken from a larger quantity (1 kg) of the composition there is no important variation of the composition concerning the weight ratio of the respective components in the small sample in comparison to other small samples and the global composition. By no important variation is meant that the variation is less than 30% relative to the global composition, inside a 1 wt % sample of P1 taken from whole P1. As an example, if the global composition P1 comprises 40 wt % of the inorganic compound (F) and 60 wt % of the (meth)acrylic copolymer (A1), a small first sample taken from the global composition that would comprise 35% wt of the inorganic compound (F) and 65 w % of the (meth)acrylic copolymer (A1) or small second sample taken from the global composition that would comprise 42% wt of the inorganic compound (F) and 58 wt % of the (meth)acrylic copolymer (A1), would signify a homogenous composition as the variation of ratio of the respective components throughout the small samples is within the 30% variation in view of the global composition of the sample.

The composition P1 is a homogenous powder having no important variation throughout the composition P1 comprising one (meth)acrylic copolymer (A1) or a mixture of two (meth)acrylic copolymers (A1a) and (A1b) with at least one filler (F) or (F1), with a variation of the composition P1 which is less than 30% relative to the global composition P1 of a 1 wt % sample of P1 taken from P1.

Preferably the variation of the components within the composition is less than 25%, more preferably less than 20%.

In an ideal case each powder particle or grain comprises the two components the meth)acrylic copolymer (A1) or the mixture of two (meth)acrylic copolymers (A1a) and (A1b) and filler and is composed of aggregated particles of the two components.

The present invention relates also to an article comprising the polymer composition as described above. This article can be a profile, a pipe, a siding, a flooring film or sheet or a foamed article.

[Methods of Evaluation]

Glass transition Temperature

The glass transitions (Tg) of the polymers or mixture of polymers are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The used frequency is 1 Hz. The apparatus records continuously, the sample deformation, keeping the stain fixed, during a controlled program of temperature variation.

The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Fusion Efficiency

The fusion efficiency of the PVC polymer composition is estimated by measuring the fusion time with a torque rheometer based on ASTM D2538-02 (reapproved 2010). A shorter fusion time signifies a better fusion efficiency.

Impact Strength

ASTM D5420 standard was used to evaluate the dart drop impact resistance of the compositions. Normalized Mean Failure Energy (in*lbs/mil) was reported for comparison.

EXAMPLES

Abbreviations

MMA—methyl methacrylate
BA—n-butyl acrylate
EA—ethyl acrylate
PVC—polyvinylchloride The filler for the (meth)acrylic copolymer (A1) or a mixture of two (meth)acrylic copolymers (A1a) and (A1b) as processing aid (PA) is calcium carbonate ($CaCO_3$). $CaCO_3$ slurry or dispersion is prepared according to the technique described in J.P. Pat. No. 59057913. Namely the slurry is obtained by mixing 270 parts of water, 0.72 parts of sodium polyacrylate and 729.3 parts of $CaCO_3$ of diam. 0.2-0.6.mu. and 0.6% moisture and stirring for 20 min at shear rate 5. times. 102/s. The obtained solid content is 73 wt %.

Comparative Example 1

Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4166.4 g of methyl methacrylate and 1041.6 g of n-butyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the latex removed. The latex is dried by spray drying.

Comparative Example 2

Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 3171.7 g of methyl methacrylate, 473.9 g of n-butyl acrylate and 0.08 g of n octyl mercaptan was nitrogen-degassed for 30 minutes. Next, the mixture was rapidly introduced into the reactor using a pump. When the temperature of the reaction mixture reached 55 degrees centigrade, 4.26 g of potassium persulfate dissolved in 98.08 g of water were introduced. The line was rinsed with 50 g of water. The reaction mixture was left to rise in temperature to the exothermal peak. When the temperature was decreased at 70° C., a mixture comprising 426.5 g of methyl methacrylate and 250.54 g of n-butyl acrylate, previously nitrogen-degassed for 30 minutes, was rapidly introduced into the reactor using a pump. The polymerization was then left to completion for 60 minutes after the exothermal peak. The reactor was cooled down to 30 degrees centigrade and the latex removed. The latex is dried by spray drying.

Comparative Example 3

Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4687.2 g of methyl methacrylate and 520.8 g of n-butyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the latex removed. The latex is dried by spray drying.

Comparative Example 4

Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 4687.2 g of methyl methacrylate and 520.8 g of n-butyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the latex removed. The obtained solid content is 37.55%. The final product is obtained by mixing the copolymer latex and the $CaCO_3$ slurry with the following ratio, 14 kg (14000 parts) of latex and 2.40 kg (2400 parts) of slurry, and spray dried in the conditions classically used for the latex alone.

Example 1

Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 3645.6 g of methyl methacrylate and 1562.4 g of n-butyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the copolymer latex removed. The obtained solid content is 37.55 wt %. The final product is obtained by mixing the copolymer latex and the $CaCO_3$ slurry with the following ratio, 14 kg (14000 parts) of latex and 1.271 kg (1271 parts) of slurry, and spray dried in the conditions classically used for the latex alone

Example 2

The copolymer latex of the example 2 is made in the same way as in example 1. The obtained solid content is 37.55%. The final product is obtained by mixing the copolymer latex and the slurry with the following ratio, 7 kg (7000 parts) of latex and 2.40 kg (2400 parts) of slurry, and spray dried in the conditions classically used for the latex alone.

Example 3

Charged into a reactor, with stirring, were 8600 g of water, 5.23 g of $Na_2CO_3$ and 38.20 g of sodium lauryl sulfate, and the mixture was stirred until complete dissolution. Three vacuum-nitrogen purges were carried out in succession and the reactor left under a slight vacuum. The reactor was then heated. At the same time, a mixture comprising 3645.6 g of methyl methacrylate and 1562.4 g of ethyl acrylate was nitrogen-degassed for 30 minutes. Next, the mixture was rapidly introduced into the reactor using a pump. When the temperature of the reaction mixture reached 55 degrees centigrade, 7.81 g of potassium persulfate dissolved in 98.08 g of water were introduced. The line was rinsed with 50 g of water. The reaction mixture was left to rise in temperature to the exothermal peak. The polymerization was then left to completion for 60 minutes after the exothermal peak. The reactor was cooled down to 30 degrees centigrade and the latex removed. The obtained solid content is 37.55%. The final product is obtained by mixing the copolymer latex and the $CaCO_3$ slurry with the following ratio, 7 kg (7000 parts) of latex and 2.40 kg (2400 parts) of slurry, and spray dried in the conditions classically used for the latex alone.

Example 4

The copolymer latex is made in the same way as in comparative example 1. The obtained solid content is 37.55 wt %. The final product is obtained by mixing the copolymer latex and the slurry with the following ratio, 14 kg (14000 parts) of latex and 1.80 kg (1800 parts) of slurry, and spray dried in the conditions classically used for the latex alone.

The characteristics of PA samples of comparative examples and examples are summarized in table 2.

The prepared spray dried samples of comparative examples and examples are formulated at 1.5 phr as processing aid (PA) in a PVC composition. The compositions are dry blended in a Papenmeyer equipment while increasing the temperature. PVC compositions are prepared with 20 phr and 60 phr $CaCO_3$ as filler in the PVC respectively.

TABLE 1

PVC compositions with two ratios of filler

| components | Composition with quantities in phr | |
|---|---|---|
| PVC | 100 | 100 |
| 1 pack CaZn | 4 | 4 |
| CaCo3 | 20 | 60 |
| PA from respective comparative examples and examples | 1.5 | 1.5 |

As polyvinylchloride PVC S110P from Kemone is used. As one pack stabilizer Ca/ZN Naftosafe GWX 380 D-3 from Chemson is used.

The samples are tested for fusion efficiency with a torque rheometer.

The fusion efficiency is evaluated relatively to compositions comprising comparative examples 1 and 2. Comparative example 1 and 2 are processing aid compositions without a filler. Its fusion efficiency is judged with ++. All other examples or comparative examples that have fusion time within an interval of +/−10 s are also judged ++. If the fusion time is faster in an interval −25 s to −10 s the example is judged +++. If the fusion time is faster in an interval −50 s to −25 s the example is judged ++++. If the fusion time is 50 s faster than comparative example 1 in an interval up to −50 s the example is judged +++++. If the fusion time is slower than comparative example 1 and 2 with at least +10 s it is judged +.

Results of fusion efficiency are summarized in table 2.

TABLE 2

Characteristics of PA made in the respective examples and comparative examples and their evaluation of fusion efficiency in a composition

| PA | | Filler content in PA/ [wt %] | Tg of PA/ [° C.] | Mw/ [*10$^6$ g/mol] | Fusion efficiency | |
|---|---|---|---|---|---|---|
| | | | | | 20 phr | 60 phr |
| Comparative example 1 | MMA/BA 80/20 | 0 | 96 | 4.5 | ++ | ++ |
| Comparative example 2* | MMA/BA 79/21 | 0 | 93** | 3.6 | ++ | ++ |
| Comparative example 3 | MMA/BA 90/10 | 0 | 107 | 4.5 | + | +++++ |
| Comparative example 4 | MMA/BA 90/10 | 25 | 107 | 4.5 | + | +++++ |
| Example 1 | MMA/BA 70/30 | 15 | 72 | 4.5 | ++++ | +++ |
| Example 2 | MMA/BA 70/30 | 40 | 72 | 4.5 | +++ | ++++ |
| Example 3 | MMA/EA 70/30 | 40 | 80 | 4.5 | +++ | ++++ |
| Example 4 | MMA/BA 80/20 | 20 | 96 | 4.5 | ++ | ++++ |

*Mixture of two copolymers
**Tg corresponds to the average Tg of the mixture of the two copolymers The examples 1 to 4 in table 2 show that the fusion efficiency of a composition of a (meth)acrylic copolymer (A1) comprising a filler in a filled halogen containing thermoplastic polymer (PVC), does perform equal or better than the comparative examples, especially with low and high ratio of filler in composition.

Comparative examples 3 and 4, based on a high Tg processing aid, respectively non filled and filled, perform worse in a composition comprising only 20 phr of $CaCO_3$. This kind of processing aid cannot be used independently of the filler ratio in the composition.

TABLE 3

Characteristics of PA made in the respective examples and comparative examples and their evaluation of impact strength in a composition

| PA | | Filler content in PA/ [wt %] | Tg of PA/ [° C.] | Mw/ [*10$^6$ g/mol] | Gardner falling weight Impact strength ASTM D5420 [in * lbs/mil] | |
|---|---|---|---|---|---|---|
| | | | | | 20 phr | 60 phr |
| Comparative example 1 | MMA/BA 80/20 | 0 | 96 | 4.5 | 0.89 | n.m. |
| Comparative example 3 | MMA/BA 90/10 | 0 | 107 | 4.5 | 0.40 | 0.33 |
| Comparative example 4 | MMA/BA 90/10 | 25 | 107 | 4.5 | 0.45 | 0.2 |
| Example 2 | MMA/BA 70/30 | 40 | 72 | 4.5 | 0.6 | 0.32 | n.m. - not measured

The example 2 in table 3 show that the impact strength of a composition of a (meth)acrylic copolymer (A1) with a low Tg comprising a filler in a filled halogen containing thermoplastic polymer (PVC), possesses a good compromise. At low filled composition (20 phr) the loss of impact performance is much less than high Tg (meth)acrylic copolymer (A1) process aid (PA), either with part of filler already in PA (comparative example 4) or without filler already in PA (comparative example 3). At higher filled compositions (60 phr) the impact performance is equal than high Tg (meth) acrylic copolymer (A1) process aid (PA) without filler already in PA (comparative example 3), and better than high Tg (meth)acrylic copolymer (A1) process aid (PA) with part of filler already in PA (comparative example 4).

The invention claimed is:

1. A composition comprising:
   A) agglomerated spherical particles P1 comprising:
      i) (meth)acrylic copolymer (A1) or a mixture of two (meth)acrylic copolymers (A1a) and (A1b) comprising at least 50 wt % of polymeric units coming from methyl methacrylate, and
      ii) particles of filler (F) or a mixture of particles of two fillers (F1) and (F2), wherein (F), (F1), and (F2) are mineral filler selected from the group consisting of precipitated calcium carbonate (PCC), grinded natural calcium carbonate (GCC) and nanosized particles of precipitated calcium carbonate (NPCC),
   B) halogen containing thermoplastic polymer, and
   C) filler (F) or said mixture of two fillers (F1) and (F2) wherein the glass transition temperature Tg of the (meth)acrylic copolymer (A1) or the mixture of two (meth)acrylic copolymers (A1a) and (A1b) is between 70° C. and 105° C., and the quantity of the filler F or the mixture of two fillers (F1) and (F2) is between 1 phr and 250 phr relative to the halogen containing thermoplastic polymer, and the molecular weight Mw of the (meth)acrylic copolymer (A1) or the two (meth)acrylic copolymers (A1a) and (A1b) comprising at least 50 wt % of polymeric units coming from methyl methacrylate is at least 300,000 g/mol,
   wherein said composition comprises between 0.15 phr and 9 phr of the (meth)acrylic copolymer (A1) or the mixture of two (meth)acrylic copolymers (A1a) and (A1b) relative to the halogen containing thermoplastic polymer, such that
   part of the filler (F) or part of the mixture of two fillers (F1) and (F2) is added to (meth)acrylic copolymer (A1) or the mixture of two (meth)acrylic copolymers (A1a) and (A1b) and the other part of the filler (F) or the other part of the mixture of two fillers (F1) and (F2) is added to the composition either apart or already with halogen containing thermoplastic polymer.

2. The composition according to claim 1, wherein the quantity of the filler (F) or mixture of two fillers (F1) and (F2) is more than 2 phr relative to the halogen containing thermoplastic polymer.

3. The composition according to claim 1 comprising between 2 phr and 200 phr of the filler (F) or mixture of two fillers (F1) and (F2) relative to the halogen containing thermoplastic polymer.

4. The composition according to claim 1 comprising between 0.15 phr and 4 phr of the (meth)acrylic copolymer (A1) or the mixture of two (meth)acrylic copolymers (A1a) and (A1b) relative to the halogen containing thermoplastic polymer.

5. The composition according to claim 1 wherein the molecular weight Mw of the (meth)acrylic copolymer (A1) or the two (meth)acrylic copolymers (A1a) and (A1b) comprising at least 50 wt % of polymeric units coming from methyl methacrylate is less than 20,000,000 g/mol.

6. The composition according to claim 1 wherein the molecular weight Mw of the (meth)acrylic copolymer (A1) or the two (meth)acrylic copolymers (A1a) and (A1b) comprising at least 50 wt % of polymeric units coming from methyl methacrylate is between 1,000,000 g/mol and 12,000,000 g/mol.

7. The composition according to claim 1 wherein the glass transition temperature Tg of the (meth)acrylic copolymer (A1) or the mixture of two (meth)acrylic copolymers (A1a) and (A1b) is between 70° C. and 100° C.

8. The composition according to claim 1 wherein the halogen containing thermoplastic polymer is selected from the group consisting of homo polymers and copolymers of vinylchloride comprising at least 50 wt % of vinylchloride units.

9. A process for preparing a composition according to claim 1, said process comprises the step of:
   blending agglomerated spherical particles P1 with said halogen containing thermoplastic polymer and filler (F) or a mixture of two fillers (F1) and (F2), wherein (F), (F1), and (F2) are mineral filler selected from the group consisting of precipitated calcium carbonate (PCC), grinded natural calcium carbonate (GCC) and nanosized particles of precipitated calcium carbonate (NPCC).

10. A process for preparing a composition according to claim 1, said process comprises the step of:
   blending agglomerated spherical particles P1 and composition P2 wherein
      composition P2 comprises said halogen containing polymer and a a filler (F) or a mixture of (F1) and (F2)
   wherein the glass transition temperature Tg of the (meth) acrylic copolymer (A1) or mixture of two (meth)acrylic copolymers (A1a) and (A1b) is less than 100° C. and the quantity of the filler (F) or a mixture of (F1) and (F2) is between 1 phr and 250 phr relative to the halogen containing thermoplastic polymer.

11. The process according to claim 9 wherein the agglomerated spherical particles P1 are obtained by a method comprising the step of:
   a) mixing at least one (meth)acrylic copolymer (A1) or a mixture of two (meth)acrylic copolymers (A1a) and (A1b) with at least one filler (F) or a mixture of (F1) and (F2),
   wherein the (meth)acrylic copolymer (A1) or the mixture of two (meth)acrylic copolymers (A1a) and (A1b) and the filler (F) or the mixture of (F1) and (F2) in step a) are in form of a dispersion in aqueous phase.

12. The process according to claim 9 wherein the agglomerated spherical particles P1 are obtained by a method comprising the step of;
   a) mixing at least one (meth)acrylic copolymer (A1) or a mixture of two (meth)acrylic copolymers (A1a) and (A1b) with at least one filler (F) or a mixture of (F1) and (F2),
   b) recovering of the mixture obtained in a),
   c) drying the recovered mixture of step b),
wherein the (meth)acrylic copolymer (A1) or a mixture of two (meth)acrylic copolymers (A1a) and (A1b) and the mineral filler in step a) are in form of a dispersion in aqueous phase.

13. The process according to claim 9 wherein the agglomerated spherical particles P1 comprise between 1 wt % and 50 wt % filler (F) or (F1) relative to the total weight of P1 made of (meth)acrylic copolymer (A1) or the mixture of two (meth)acrylic copolymers (A1a) and (A1b) and filler.

14. The process according to claim 9 wherein the agglomerated spherical particles P1 are a powder.

15. The process according to claim 9 wherein agglomerated spherical particles P1 are a powder having volume median particle size D50 between 1 µm and 500 µm.

16. The process according to claim 14 wherein each powder particle of the agglomerated spherical particles P1 comprises the two components of i) the (meth)acrylic copolymer (A1) or the mixture of two (meth)acrylic copolymers (A1a) and (A1b) and ii) the filler (F) or a mixture of (F1) and (F2).

17. The process according to claim 9 wherein the molecular weight Mw of the (meth)acrylic copolymer (A1) or the two (meth)acrylic copolymers (A1a) and (A1b) comprising at least 50 wt % of polymeric units coming from methyl methacrylate is between 1,000,000 g/mol and 12,000,000 g/mol.

18. An article comprising a composition according to claim 1.

19. An article according to claim 18 which is a profile, a pipe, a siding, a flooring film or flooring sheet.

* * * * *